US008169316B2

(12) United States Patent
Freathy et al.

(10) Patent No.: US 8,169,316 B2
(45) Date of Patent: May 1, 2012

(54) ACTIVE WIRELESS TAG AND AUXILIARY DEVICE FOR USE WITH MONITORING CENTER FOR TRACKING INDIVIDUALS OR OBJECTS

(75) Inventors: Stephen Freathy, Houston, TX (US); Paul Pridmore, Houston, TX (US); Steve Logan, Houston, TX (US)

(73) Assignee: Satellite Tracking of People, LLC, Houston, TX (US)

( * ) Notice: Subject to any disclaimer, the term of this patent is extended or adjusted under 35 U.S.C. 154(b) by 0 days.

(21) Appl. No.: 13/093,346

(22) Filed: Apr. 25, 2011

(65) Prior Publication Data

US 2011/0201274 A1    Aug. 18, 2011

Related U.S. Application Data

(63) Continuation of application No. 11/847,106, filed on Aug. 29, 2007, now Pat. No. 7,961,092.

(60) Provisional application No. 60/840,844, filed on Aug. 29, 2006, provisional application No. 60/859,232, filed on Nov. 15, 2006.

(51) Int. Cl.
*G08B 1/08* (2006.01)

(52) U.S. Cl. .............. 340/539.1; 340/2.4; 340/3.31; 340/539.11

(58) Field of Classification Search .............. 340/539.13
See application file for complete search history.

(56) References Cited

U.S. PATENT DOCUMENTS 4,827,943 A    5/1989 Bornn et al.
(Continued)

FOREIGN PATENT DOCUMENTS
WO    WO-2008027948 A2    3/2008
(Continued)

OTHER PUBLICATIONS

International Search Report and Written Opinion, International Application No. PCT/US07/77080, issued Apr. 14, 2008.
(Continued)

*Primary Examiner* — Jennifer Mehmood
*Assistant Examiner* — Naomi Small
(74) *Attorney, Agent, or Firm* — Connolly Bove Lodge & Hutz LLP (57) ABSTRACT

The invention is directed to a location tracking device and auxiliary device for use with a monitoring center for tracking individuals or objects. The location tracking device has position determining circuitry and first wireless circuitry that communicates position data representative of the location of the tracking device to a remote location (e.g., a monitoring station). The tracking device also has second wireless circuitry that communicates with the auxiliary device. The tracking device has at least two operational modes. The tracking device switches operational modes when communication is established between the tracking device and the auxiliary device. The auxiliary device generally has an associated auxiliary device ID and wireless circuitry that communicates the auxiliary device ID to the location tracking device. The tracking device has a first operational mode, when communication is not established with the auxiliary device, wherein the position determining circuitry is maintained in a normal power state. The tracking device can also have a second operational mode, when communication is established between the tracking device and the auxiliary device. In the second operational mode, the second wireless circuitry receives the auxiliary device ID from the auxiliary device and the first wireless circuitry communicates the auxiliary device ID to the remote location. The tracking device can also have a third operational mode, when communication is established between the tracking device and the auxiliary device. In the third operational mode, the position determining circuitry is placed in a reduced power state.

28 Claims, 5 Drawing Sheets

U.S. PATENT DOCUMENTS

| | | | |
|---|---|---|---|
| 5,646,593 | A | 7/1997 | Hughes et al. |
| 6,317,049 | B1 | 11/2001 | Toubia et al. |
| 6,774,797 | B2 | 8/2004 | Freathy et al. |
| 7,236,091 | B2 * | 6/2007 | Kiang et al. ............... 340/539.1 |
| 7,250,860 | B2 * | 7/2007 | Smith et al. .............. 340/539.22 |
| 7,339,469 | B2 | 3/2008 | Braun |
| 7,652,571 | B2 | 1/2010 | Parkulo et al. |
| 2002/0173887 | A1 | 11/2002 | Flick |
| 2004/0174264 | A1 | 9/2004 | Reisman et al. |
| 2005/0130672 | A1 | 6/2005 | Dean et al. |
| 2005/0181805 | A1 | 8/2005 | Gallagher |
| 2006/0012476 | A1 | 1/2006 | Markhovsky et al. |
| 2006/0199537 | A1 | 9/2006 | Eisenbach |
| 2007/0103324 | A1 | 5/2007 | Kosuge et al. |
| 2007/0115115 | A1 * | 5/2007 | Meyers .................... 340/539.13 |
| 2007/0247359 | A1 | 10/2007 | Ghazarian |
| 2008/0036610 | A1 | 2/2008 | Hokuf et al. |

FOREIGN PATENT DOCUMENTS

| | | |
|---|---|---|
| WO | WO-2008027985 A2 | 3/2008 |

OTHER PUBLICATIONS

International Search Report and Written Opinion, International Application No. PCT/US07/77142, issued Mar. 6, 2008.

Examination Report Under Section 18(3), United Kingdom Application No. GB0903439.8, issued Sep. 20, 2011.

* cited by examiner

ACTIVE WIRELESS TAG AND AUXILIARY DEVICE FOR USE WITH MONITORING CENTER FOR TRACKING INDIVIDUALS OR OBJECTS

CROSS-REFERENCE TO RELATED APPLICATIONS

The present application is a continuation of U.S. patent application Ser. No. 11/847,106 filed Aug. 29, 2007, which claims priority to U.S. Provisional Patent Application Ser. No. 60/840,844, filed Aug. 29, 2006, and U.S. Provisional Patent Application Ser. No. 60/859,232, filed Nov. 15, 2006, the entire contents of which are incorporated herein by reference. This application is also related to U.S. patent application Ser. No. 11/847,146 entitled "Wireless Tag and Auxiliary Device for Use With Home Monitoring Unit for Tracking Individuals or Objects."

FIELD OF THE INVENTION

The present invention relates to systems which provide location tracking and monitoring of a portable tracking device or "tag" that is affixed to an individual or other object, and in which the device periodically communicates data to a remote monitoring station. More specifically, the present invention relates to the implementation of limited RF capability in the tag and another system device, hereinafter "auxiliary device" to provide improved system features and functions.

BACKGROUND OF THE INVENTION

Electronic location monitoring and tracking of individuals or objects can be carried out in a number of ways. Determining the location of the tag can be provided using well-known techniques, such as GPS, cellular triangulation, or a combination of both. Further, in certain system applications, tamper detection capability and the ability to generate alarms upon detecting tampering or upon other conditions may be included. There are variants of electronic location monitoring and tracking systems. For example, some systems rely upon electronic monitoring at a fixed located such as the individual's home or place of employment. These systems can rely upon a land line telephone link and are commonly known as house arrest systems. These systems utilize a transmitter worn by the individual and a stationary receiver located at the monitoring location. When the individual is an "offender", i.e., a person under a government-supervised program, the transmitter incorporates tamper-detection capabilities and upon such detection may transmit an alarm. The worn transmitter transmits a signal a short distance to the receiver located at the monitoring location. The receiver communicates with a central monitoring service over standard telephone lines. The tracking system of this type is limited in that it can only provide an indication of the presence or absence of the individual at the monitored location at a given time. This type of system cannot offer location information if the individual leaves the monitored location.

U.S. Pat. Nos. 5,867,103 and 6,160,481, which are incorporated by reference herein, disclose a system which provides for a locational tracking of a plurality of monitored persons. The system has a portable monitoring device for each of the monitored persons. Each portable monitoring device has means to secure the device to a respective monitored person and may include means to detect tampering with the secured device for offender applications. Additionally, each portable monitoring device has means to receive a distinct signal generated by a detached sending unit. Each portable monitoring device also has means to transmit a signal containing data. The system further has means to acquire the signal containing data transmitted by each respective portable monitoring device. The system has means to determine a positional location of the portable monitoring device based, at least in part, upon the distinct signal received by the portable monitoring device. The system has means to mark, at least within a range of time references, when the positional location reference was determined in the form of an occurrence reference. The system has means to store, for archival retention within a locational tracking database, at least a series of the position references and associative occurrence references of each portable monitoring devices of the tracking system.

U.S. Pat. No. 6,774,797, which is incorporated by reference herein, discloses a one-piece lightweight waterproof personal tracking tag which is attached to an individual using either a tamper detection strap or other suitable means of connection. The tag communicates with a global positioning satellite network and a wireless network to obtain geographic location information and to exchange data with a centralized data system. The tag monitors the location of the wearer of the tag, compares the monitored location to a database of acceptable and unacceptable location and time parameters and provides updates to a centralized database system, the monitoring center, and receives downloads and updates from the system.

For locational tracking and monitoring of one or more individuals, each having an individual set of allowed geographic and temporal restrictions, the system must maintain an extensive database of individuals and corresponding restrictions. In such applications, the tag preferably incorporates a microcontroller, flash memory, a cellular modem, a GPS receiver, tamper detection, and a rechargeable battery in a single lightweight unit. One or more individuals are provided with a tracking tag. Each of the tags reports into the monitoring center on a periodic basis. The reporting basis can be on a predetermined schedule and/or can be based upon detection of a violation or other reportable condition detected by the tag itself. Information reporting by the various tags is recorded and analyzed at the monitoring center by the data tracking system to determine if individual violations have occurred. The centralized data tracking system can then take an appropriate action to notify, respond to and/or correct the noted violation.

The tag's ability to properly function is limited by the capabilities of the tag's battery and the ability of the tag's circuitry to function properly in different locations. Current GPS based tracking systems, for example, will not function properly when GPS reception becomes impaired or is lost. In addition, the demands of system applications place increasing power loads and operating time requirements on the tag's batteries. Both of these shortcomings can be especially acute in offender tracking and monitoring applications where loss of offender locational monitoring is unacceptable. It would be desirable to provide a mechanism for efficiently extending the range of such GPS tracking systems particularly in areas in which GPS reception is impaired. It would also be desirable to provide such extended coverage where no action is required by the offender. It would also be desirable to provide such expanded coverage where removal of the offender's GPS device is not required.

SUMMARY OF THE INVENTION

The invention is directed to a location tracking device and auxiliary device for use with a monitoring center for tracking individuals or objects. The location tracking device has position determining circuitry and first wireless circuitry that communicates position data representative of the location of the tracking device to a remote location (e.g., a monitoring station). The tracking device also has second wireless circuitry that communicates with the auxiliary device. The tracking device has at least two operational modes. The tracking device switches operational modes when communication is established between the tracking device and the auxiliary device. The tracking device can switch modes automatically once communication is established between the tracking device and the auxiliary device. In the alternative, the monitoring station can direct the tracking device to switch operational modes based. The decision on whether to switch operation modes can be at least partially based on the received auxiliary device ID (e.g., the monitoring station can create an inclusion zone as discussed below).

As discussed above, the auxiliary device generally has an associated auxiliary device ID and wireless circuitry that communicates the auxiliary device ID to the location tracking device. The auxiliary device can also include a housing and tamper detection circuitry that detects unauthorized movement or opening of the auxiliary device. The auxiliary can be AC or battery powered and can be portable or can be placed in a user selectable location. This location can be known to the monitoring station and can be utilized to create an inclusion zone. In the alternative, the location of the auxiliary device can be unknown (e.g., portable auxiliary device). In this case, the location of the auxiliary device is effectively determined once communications is established with a tracking device (e.g., the tracking device can report its location and the auxiliary device ID to the monitoring station). This can allow the monitoring station to create an exclusion zone as discussed below.

The tracking device has a first operational mode, when communication is not established with the auxiliary device, wherein the position determining circuitry is maintained in a normal power state. The tracking device can also have a second operational mode, when communication is established between the tracking device and the auxiliary device. In the second operational mode, the second wireless circuitry receives the auxiliary device ID from the auxiliary device and the first wireless circuitry communicates the auxiliary device ID to the remote location. This mode can be used to create an exclusion zone. The decision to create an exclusion zone can be at least partially based on the received auxiliary device ID. In a typical embodiment, the first wireless circuitry comprises a cellular modem and the second wireless circuitry comprises an RF transceiver.

The tracking device can also have a third operational mode, when communication is established between the tracking device and the auxiliary device. In the third operational mode, the position determining circuitry is placed in a reduced power state. The second wireless circuitry receives the auxiliary device ID from the auxiliary device and the first wireless circuitry communicates the auxiliary device ID to the remote location. This mode can be used to create an inclusion zone. The decision to create an inclusion zone can be at least partially based on the received auxiliary device ID. The tracking device can also include a battery for powering circuitry associated with, or internal to, the tracking device. Battery consumption is reduced when the position determining circuitry is placed in a reduced power state. The tracking device can also include a housing and a strap that secures the tracking device to an object or individual and tamper detection circuitry that detects unauthorized removal or opening of the tracking device.

The tracking device can include signal strength circuitry associated with the second wireless circuitry. This signal strength circuitry can be used by the tracking device to determine whether radio energy received by the second wireless circuitry is below a predetermined threshold. This can provide range adjustment capability for the second wireless link. The tracking device can also include i) time slot allocation circuitry and/or ii) frequency allocation circuitry. This circuitry can allow the tracking device to minimize contention for frequencies or time slots associated with the second wireless circuitry.

The invention is also directed to a location tracking system that includes the tracking device and auxiliary device as discussed above. The system can also include a home monitoring unit (HMU) with third wireless circuitry that communicates with the auxiliary device wireless circuitry and/or the tracking device second wireless circuitry. This can expand the range of the HMU when communication is established between the location tracking device and the auxiliary device.

In some case the monitoring station can perform i) proximity detection and/or ii) predictive correlation based on the location of the tracking device and the auxiliary device ID.

The invention is also directed to a location tracking method. The method includes providing a tracking device having position determining circuitry and first wireless circuitry that communicates position data representative of the location of the device to a remote location and second wireless circuitry. The method also includes providing an auxiliary device having wireless circuitry that communicates with the tracking device second wireless circuitry. The tracking device has at least two operational modes. The tracking device switches operational modes when communication is established between the location tracking device and the auxiliary device as discussed above.

BRIEF DESCRIPTION OF THE DRAWINGS

For a better understanding of the present invention, reference is made to the following description and accompanying drawings.

DETAILED DESCRIPTION OF THE INVENTION

Figure 1:
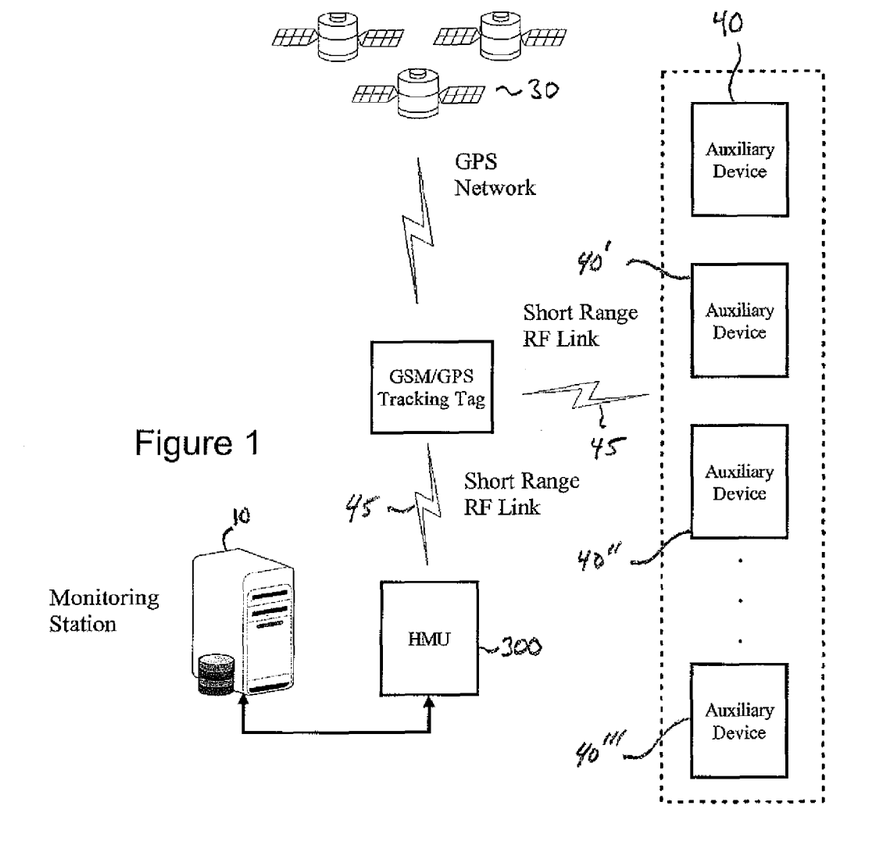
FIG. 1 shows a block diagram of a system in accordance with the invention.

FIG. 1 shows a block diagram of a system in accordance with the invention. The system includes a central monitoring system (CMS) 10, a tracking tag 20 operable to communicate with a Global Positioning Satellite (GPS) network 30 and one or more auxiliary devices 40. The strap or tag may incorporate tamper detection using a variety of well-know technologies. The tag 20 can be attached to an object or individual using a strap or other suitable means of connection. For example, the tag can be attached to a package that is being transported from one location to another. In the alternative, the tag can be attached to in individual under "house arrest" that being monitored for compliance. Numerous other scenarios can be envisioned without departing from the scope of the invention.

The tag 20 communicates with the GPS network 30 and a wireless network 25 to respectively obtain geographic location information and to exchange data with the CMS 10. The CMS monitors the location of the tag (as well as the object or individual to which the tag is attached) and compares the monitored location to a database of acceptable and unacceptable location and time parameters. The tag generally transmits position updates to the CMS and also receives downloads and updates from the CMS.

In order to track one or more individuals or objects, each of which having an individual set of allowed geographic and temporal restrictions, the CMS 10 maintains a database 15 of individuals or objects and corresponding restrictions. In one embodiment, the tag 20 generally incorporates a microcontroller, flash memory, a cellular modem, a GPS receiver, tamper detection, and a rechargeable battery into a single unit as discussed in more detail below. While the foregoing description focuses primarily on tracking of individuals, it is understood that the invention is equally applicable to the tracking of objects as well.

In system applications where the location of a plurality of individuals are being monitored and tracked, each such individual is provided with a tracking tag. To lengthen battery life and reduce data accumulation, each of the tags preferably reports into the CMS 10 on an intermittent or periodic basis. The reporting basis can be on a predetermined schedule and/or can be based upon detection of a violation or other reportable condition detected by the tag itself. Information reporting by the various tags is recorded and analyzed at the CMS to determine if individual violations have occurred. The CMS can then take an appropriate action to notify, respond to and/or correct the noted violation.

The system also includes at least one auxiliary device 40. The auxiliary device 40 works in conjunction with the tag 20 which will intermittently or periodically request the presence of an auxiliary device 40 by sending out a RF transmission ("ping") and waiting for a reply from any auxiliary device in range via the short range radio (or RF) link 45. The typical range in an exemplary system is approximately 100 meters in open area. The auxiliary device includes: power supply circuitry (e.g., for AC or DC power), battery charging circuitry, a battery backup for remote operations, a RF transceiver, a microcontroller and various alarm features to detect and report movement, power loss and light ingress as discussed in more detail below. Each auxiliary device can be identified by a unique serial number which is transmitted in its response to a ping from tag 20. The auxiliary device serial number can also be transmitted in a last reported alarm status response. The auxiliary device 40 can store any alarms in non volatile memory to ensure that in the event of loss of power data is retained. The auxiliary device can also retain the status of any alarms until it is able to reply to a valid request from tag 20.

I—Tracking Tag

Figure 2:
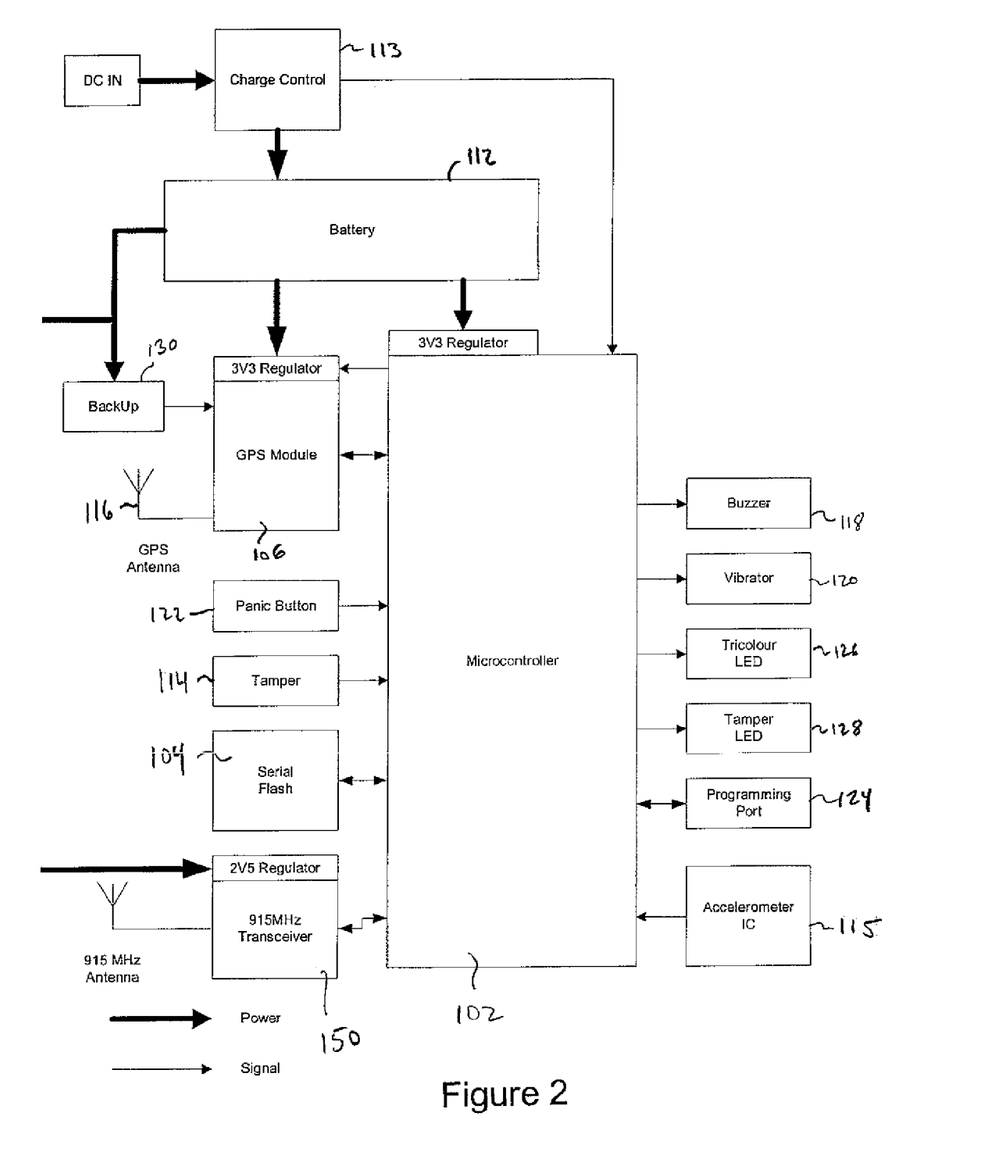
FIG. 2 is a block diagram of a tracking tag in accordance with the invention.

FIG. 2 is a block diagram of a tag 20 in accordance with the invention. The tag 20 has a microcontroller 102, associated flash memory 104 and a GPS receiver 106 which provides up GPS position information to the microcontroller 102. The tag can include a cellular modem 108 with an associated SIM card 110 provided for data communication between the tag 20 and the CMS 10. As shown in FIG. 1, the tag 20 communicates through a wireless network 25 with the CMS 10. A tag configured to communicate with the CMS via the a cellular network is referred to herein as an "active" tag. The tag 20 also communicates with one or more GPS satellites in the GPS network 30. The tag 20 also includes an RF transceiver 150 for communication between the tag and the auxiliary device 40 via the RF link 45. This RF link creates an electronic tether between the tag and the auxiliary device. Suitable short range wireless integrated circuits and networking firmware for use in accordance with the invention are available from a variety of sources including Micrel Inc., of San Jose, Calif. (www.micrel.com). Communication via the RF link 45 is discussed in more detail in the following section.

The tag can obtain position information either through the GPS network 30 and/or through position determination techniques utilized in the wireless network 25. Wireless (cellular) based techniques for geographic location determination, commonly referred to in the wireless industry as geolocation, can include triangulation, and estimated time of delivery (EOTD) based upon the cellular ID of the base stations from which a signal is received. It is understood that the system can utilize position information obtained from GPS or geolocation techniques or both as needed (e.g., to maximize the coverage area, power utilization and/or accuracy).

The tag also includes a battery 112 to power the microcontroller 102, the cellular modem 108, the GPS receiver 106 and the other components within the tag 20. The battery 112 resides within the unit in a sealed compartment and is not removed for recharging so as to avoid potential leaks which could result from removal and replacement of the battery. Because the unit must be worn by an individual at all times, the tag will be subjected to water in such environments as showering. The battery 112 is recharged while it remains within the tag 20 by means of charger 113.

The tag may also include a tamper detection mechanism 114 to avoid unauthorized removal or opening of the tag. The specific tamper detection mechanism can be implemented in a variety of ways including: i) signal continuity detection, ii) electrical, optical or electromagnet switches or detectors that detect unauthorized opening of the tag and/or iii) electrical, thermal proximity devices which monitor the proximity of the tag to the individual or object. Accelerometer 115 is also provided and can be used to monitor acceleration of the tag 20. The microcontroller 102 can be programmed to generate an alarm based on acceleration beyond a threshold or the like.

The microcontroller 102 controls the operation of the tag 20. Regular poles of the cellular modem 108 and GPS receiver 106 are carried out to monitor for incoming command messages and to monitoring the location of the tag. The parameters of the monitoring to be performed are programmed into the microcontroller 102 to respond to variations in the location of the tag and to respond to commands received from the CMS 10 through the cellular modem 108.

The flash memory 104 holds the programmed code for the operation of the tag 20. The code is downloaded to the unit utilizing a serial link and can be modified and/or downloaded through the cellular modem connection 108. In the alternative, the code can be downloaded via programming port 124.

Communication between the tag 20 and the CMS 10 is carried out via the cellular modem 108. During operation, the modem remains logged into the cellular network, allowing the tag to be called from the CMS to request current operating status. The tag can also be polled by the CMS to download the position of the tag as measured by the GPS system and/or to download other operating parameters such as violation history, position history and/or battery status.

The microcontroller 102 is programmed to monitor for alarm conditions, such as violations of restrictions by the tag wearer. In the event that an alarm condition occurs, for example low battery voltage, a tamper detection by the tamper prevention unit 114 or a violation of the geographic limitations set for the wearer of the tag, the microcontroller communicates an alarm condition to the CMS 10. The microcontroller can run continuously or can be programmed to cycle the entire tag through an intermittent power pattern, such as a sleep mode, to conserve battery power.

The microcontroller code also includes the ability to be manually placed into a sleep mode wherein the unit is not powered down but only inactive, upon receipt of an appropriate command from the CMS 10. Powering down of the tag 20 can be used to prolong the life of the battery 112. By allowing a power down to be controlled by the CMS, the tag can be powered down without the knowledge of the offender. Because the individual does not know when the unit is inactive, the individual cannot take advantage of inactivity to commit an offense without detection. The unit can reactivate after a set period of time, after being connected to a recharger or after receipt of a command to reactivate.

The SIM card 110 is sealed within the tag unit and cannot be accessed by the wearer. The SIM card contains details relating to cellular activation and/or the cellular service provider. The term "SIM card" is used herein a general sense and encompasses other devices for use with various types of cellular service such as a Universal Integrated Circuit Card (UICC), Removable User Identity Module (RUIM) or the like. The GPS module is used with an appropriate antenna 116, such as a patch antenna mounted internal to the tag case. The GPS module can also include a battery backup 130 to maintain settings when main power is removed from the GPS module. The GPS module when activated will obtain the current position of the tag. If no fix is obtained, the tag will report that no fix was obtained. To minimize the power consumption and therefore maximize the battery charge life, the GPS receiver is used in the push to fix mode. The receiver is normally asleep and, only when requested, wakes to obtain the current position of the tag.

The tag 20 also collects cell ID from the wireless system through the wireless cellular modem 108 and EOTD information when provided by the network. The use of cell ID and EOTD can be used to determine the tag position, as is known in the art, however with less accuracy than the GPS receiver. The tag 20 can use this secondary position information as a confirmation of the fix obtained by the GPS receiver or as a substitute for the GPS positioning when a GPS position is unavailable.

The tag 20 can include an audible alarm such as a buzzer 118, a tactile alarm such as a vibrator 120 to provide an indication to the wearer that a condition requiring attention has been detected. The tag can also include a panic button 122 to allow the wearer to alert the CMS 10 that a situation requiring attention exists. This button can be particularly useful when the tag is used by an individual being monitored because of the individuals potential need for assistance. Other visual alerts such as Tricolor LED 126 (e.g., for system status and the like) and Tamper LED 128 can be provided.

II—Auxiliary Device

Figure 3:
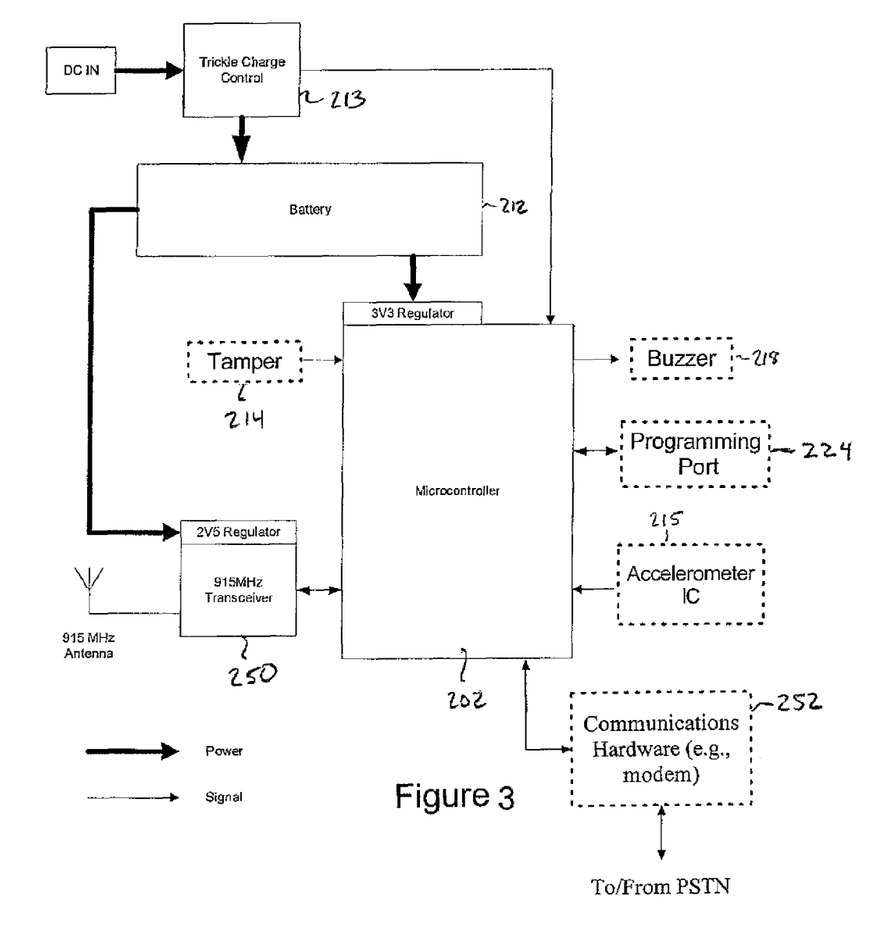
FIG. 3 shows a block diagram of an auxiliary device in accordance with the invention.

FIG. 3 shows a block diagram of an auxiliary device 40 in accordance with the invention. The auxiliary device 40 has a microcontroller 202 with associated internal memory and an RF transceiver 250 for communication between the tag 20 and the auxiliary device 40 via the RF link 45. It is understood that the microcontroller 202 can utilize internal memory, external memory or both. The auxiliary device also includes a battery 212 to power the microcontroller 202, RF transceiver 250 and the other components within the auxiliary device. The battery 212 is recharged by means of charger 213. The programming code for microcontroller 202 can be downloaded via typical techniques. For example, the programming for microcontroller 202 can be burned into the appropriate memory device prior to or during assembly. In the alternative, programming code can be downloaded via optional programming port 224.

The auxiliary device can optionally include a tamper detection mechanism 214 to avoid unauthorized removal or opening of the auxiliary device. An accelerometer 215 can optionally be provided and can be used to monitor movement of the auxiliary device. The microcontroller 202 can be programmed to generate an alarm based on acceleration beyond a threshold or the like. The auxiliary device 40 may also include an audible alarm such as a buzzer 218 to provide an indication that a condition requiring attention has been detected. The auxiliary device is preferable constructed with a small housing (e.g., 120 mm*80 mm*55 mm) and can be attached to AC power via a suitable cable or adapter (e.g., 12V adapter). The auxiliary device can be designed to be hard mounted via screws or other suitable fasteners. In the alternative the auxiliary device can be temporarily placed in a location or even worn or carried by an individual (e.g., operating via battery power). For example, the auxiliary device can be integrated into or attached to an article of clothing such as shoes, socks, pants, shirts, or jackets. In the alternative, the auxiliary device can be integrated into or attached to a backpack, purse, wallet or other convenient portable accessory.

In operation, the tag 20 will periodically poll (e.g., ping) for the presence of an auxiliary device 40 via the RF link 45. If an auxiliary device is detected (i.e., the auxiliary device responds to the ping) and communications can be established with the auxiliary device, the operational parameters of the tag and/or the system can be altered. The auxiliary device 40 will typically reply to a tag 20 with some or all of the following information: auxiliary device ID, tag ID, status of the auxiliary device (tamper, motion or power). This information is then transmitted to the CMS 10 by the tag 20. It understood that a variety of communications protocols are suitable for use in accordance with the invention. It is also understood that in some embodiments, communications between the tag and the auxiliary device can be initiated by the auxiliary device.

Several modes of operation are discussed in detail below. In each of these examples, the tag 20 relays messages from the auxiliary device to the CMS 10 via cellular modem 108 and wireless network 25. This configuration is advantageous in that the auxiliary device does not require a cellular modem to communicate to the CMS. This results in considerable cost savings and minimizes power utilization.

III—Inclusion Zone Operation (GPS Power Down)

In this mode of operation, the location of the auxiliary device 40 is fixed and is known to the CMS 10 (e.g., the location of the auxiliary device is stored in the CMS database 15). The system is operable to establish an inclusion zone defined by the range of the auxiliary device. In this mode, so long as the tag 20 is in communication with the auxiliary device, the CMS knows the location of the tag 20. Operation in this mode proceeds as follows: the tag 20 detects an auxiliary device (i.e., the auxiliary device responds to a ping). The tag establishes communications with the auxiliary device, and reports some or all of the following information to the CMS 10: auxiliary device ID, tag ID, Status of the tag (tamper, low battery and charging), status of the auxiliary device (tamper, motion or power). The auxiliary device can also be configured to recognize one or more auxiliary device groups (e.g., 40, 40', 40", 40''') and then alter its operating mode subject to a receipt from the auxiliary device that it has no alarms pending.

As an additional precaution, software in the tag 20 or the CMS may require a valid GPS fix before entering a reduced power state. The tag 20 will contact the CMS 10 via the cellular modem 108 to confirm it is going to into a reduced power or sleep state (i.e., GPS receiver 106 can be at least partially powered down in order to save battery power). In cases where the tag is unable to contact the CMS, the tag can maintain list of approved auxiliary devices and the tag can make the determination on whether or not to enter a reduced power state. This list of approved auxiliary devices can be updated by the CMS as needed. This reduced power state is particularly advantageous in locations where GPS reception is impaired. If the tag 20 cannot calculate its position via GPS, call in to the CMS 10 or if the tag receives an alarm status from the auxiliary device 40, it will remain in normal operating mode and will continue to log its status. It is understood that the location of the auxiliary device 40 can be fixed after the auxiliary device is powered up in a given location. Upon the initial communication between the tag and the CMS, the system can enter the location of the auxiliary device 40 into the database 15 before allowing the tag to enter a low power mode.

During low power mode, the tag 20 will continue to check for tampers on both itself and the auxiliary device 40. Also during low power mode, the tag 20 can increase its ping rate to the auxiliary device 40 to ensure it remains in range. The ping rate can be set to a random period between two time ranges to minimize contention with other RF devices. The tag 20 can receive a response from any member of its associated auxiliary device group and will remain asleep. During this mode, the tag 20 can also be configured to wake up at pre-set intervals to refresh its GPS position and therefore update its empheris and almanac from any GPS satellites in view. This ensures that when the tag 20 finally leaves range of an auxiliary device 40, it is able to quickly obtain a GPS position. The tag 20 can also be configured to dial into the CMS 10 at this point and report its status without the need to obtain a new GPS position or make a successful GSM call before going back to low power mode.

Upon notification from an auxiliary device of any alarm (e.g., power loss, movement or tamper, lack of valid pings . . . ) the tag 20 will wake up and resume normal mode. The tag 20 will immediately call into the CMS 10, download its status and that of the auxiliary device.

IV—Report Only Mode—Exclusion Zone Operation

In this mode of operation, the location of the auxiliary device 40 need not be known to the CMS 10. Further, for this mode of operation, the auxiliary device may be configured as a portable device that is battery operated. This can be provided by an integral auxiliary device or by configuring the auxiliary device to have a fixed component and a removable component respectively analogous to a notebook computer and its "docking station". Operation in this mode proceeds as follows: the tag 20 detects an auxiliary device (i.e., the auxiliary device responds to the ping). The tag establishes communications with the auxiliary device, and reports some or all of the following information to the CMS 10: auxiliary device ID, tag ID, Status of the tag (tamper, low battery and charging), Status of the auxiliary device (tamper, motion or power). During this mode the tag 20 will continue with its normal operations and logging but with the additional details of the auxiliary device ID received and its status. This logging can occur relatively frequently (e.g., every one minute). During this mode the tag 20 will notify the central monitoring system of every auxiliary device heard; the tag 20 does not need to be configured with the auxiliary device details. This mode is advantageous in that the system can establish exclusion zones. That is, once the tag 20 reports the presence of an auxiliary device in an excluded area, the CMS 10 can identify that unauthorized entry into that zone has taken place. This mode is also applicable to a dual tracking scenario such as the type disclosed in U.S. Pat. No. 5,867,103, which is again incorporated by reference herein.

V—HMU Range Expansion

Figure 4:
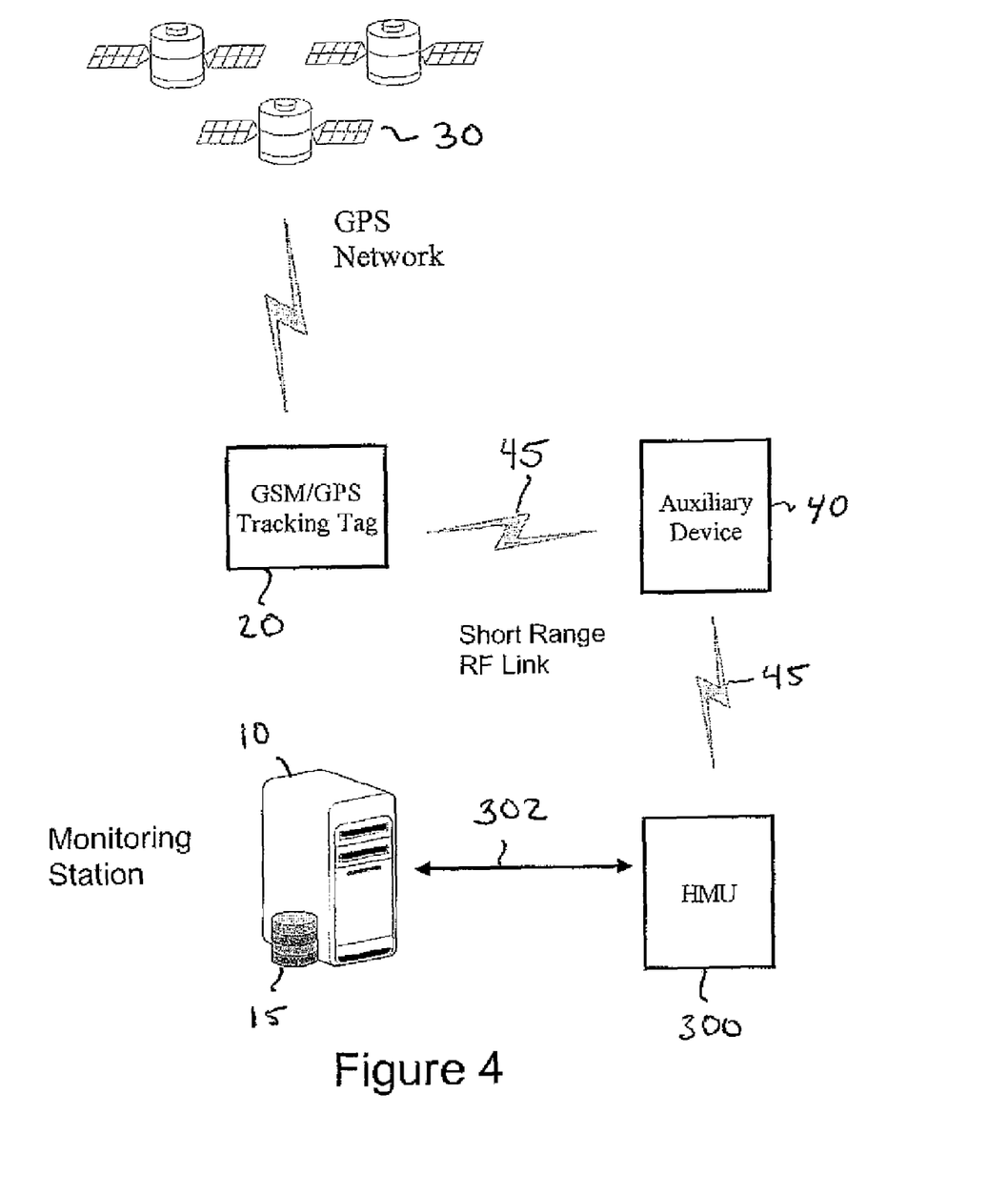
FIG. 4 shows a block diagram of an exemplary HMU range expansion scenario in accordance with the invention.

One or more auxiliary devices can also be used to extend the range of a Home Monitoring Unit (HMU) when used in a traditional "house arrest" situation. This is shown graphically in FIG. 4. In general, the HMU 300 communicates with the CMS 10 via communication link 302 (typically a land line telephone link to the PSTN). In this scenario, the HMU is also provided with an RF receiver that is operable to monitor the RF link (or electronic tether) established between a tag 20 and an auxiliary device 40. Each auxiliary device 40 can be positioned such that it can receive information from a tag 20 via the RF link 45. The auxiliary device 40 is also positioned in range of the HMU. This allows the HMU receiver to receive the reply message (from the auxiliary device to the tag) even when the tag is out of range. Receipt of the reply from the auxiliary device in effect allows the HMU to determine that the tag is within an acceptable range. The auxiliary device will only be treated as a valid source if it is previously assigned to the HMU and is not in a current alarm status.

VI—RF Network Contention—RF Frequency Allocation

In the scenarios discussed above, the RF link 45 is utilized for communication between various devices. In certain scenarios, several devices may be utilized in relatively close proximity. These devices may ultimately be in contention for use of the RF link. That is two or more devices may try to communicate via the RF link simultaneously. Accordingly, the RF link can be implemented to eliminate or reduce contention issues. For example, the RF link can be implemented with a plurality of frequencies that are allocated to various devices. In another example, the RF link can be implemented with a time slot allocation for each device. Such time slots can be assigned on a fixed or dynamic basis.

In the example shown in Table 1 below, the RF link 45 is implemented with four frequencies.

| Frequency No. | Associated Device | Description |
|---|---|---|
| 1 | HMU | Dynamic Time Slot Allocation |
| 2 | Auxiliary Device | Frequency Allocation |
| 3 | Auxiliary Device | Frequency Allocation |
| 4 | Auxiliary Device | Frequency Allocation |

In this example, frequency number 1 is utilized for communication between a tag and an HMU. The frequency band is divided into a plurality of time slots, each of which can be assigned to a specific tag. Time slot allocation can be performed on a fixed or dynamic basis. In the case of fixed time slot allocation, the given time slot can be directly programmed into the specific tag as well as the associated HMU prior to any communication taking place. In the case of dynamic time slot allocation, the tag and HMU can conduct initial communications (e.g., utilizing a pre-selected time slot) before a specific time slot is assigned to a specific tag.

In this example, frequencies 2-4 are generally utilized by a tag to communicate with an auxiliary device. In normal operation tag will intermittently or periodically request the presence of an auxiliary device by sending out a RF transmission ("ping") and waiting for a reply from any auxiliary device in range via the RF link. Each ping can be transmitted on a different frequency (2-4) until communication between the tag and the auxiliary device is established. Specific frequency can be selected on specific pattern or random frequency assignment.

VII—Wireless Link—Range Adjustment

In certain scenarios, it may be desirable to adjust the range of the wireless (RF) link 45. For example, the default communication range between a tag 20 and an auxiliary device 40 or HMU 300, 300' may extend into unintended areas such as adjoining property. Accordingly, the receiver in the auxiliary device 40 or HMU 300, 300' may include the capability to provide Received Signal Strength Indication measurements (RSSI).

It is generally understood that RSSI measurements denote the received radio signal strength. These measurements can be utilized in connection with a variety of system functions. For example, RSSI can be used internally in a wireless networking card to determine when the amount of radio energy in the channel is below a certain threshold at which point the network card is clear to send (CTS). RSSI can be measured in the IF stage before the IF amplifier. In zero-IF systems, it can be done in the baseband signal chain, before the baseband amplifier. RSSI measurements can be output as a DC analog level. However, it is beneficial to sample RSSI measurements with an internal A/D converter so that resulting numeric codes available directly to the internal processor 202 (FIG. 3). In the example below, typical RSSI measurements range from about 250 (noise level) to about 650 maximum.

In the context herein, RSSI is utilized to determine the relative proximity or range of the tag 20 to an auxiliary device 40 or HMU 300, 300'. This can be accomplished by selecting a predetermined RSSI value to set the acceptable range of the RF link 45 (i.e., the RSSI must remain above the pre-determined RSSI level to be considered within range). In the alternative, a calibration routine can be utilized. For example, the tag can be placed into a range calibration mode in which it pings every few seconds. The tag can then be moved throughout the desired location during which the auxiliary device 40 or HMU 300, 300' records the lowest RSSI measurement. Once the tag has been moved throughout the entire location at issue, the calibration process is complete and the lowest RSSI measured from the calibration process is used to set the range of the RF link 45. The system can optionally include an acceptable offset range for the RSSI measurement (e.g., user selectable) to account for environmental conditions. In this example, a typical default level for the offset range is 50. It is understood that a variety of antenna types (e.g., omnidirectional, directional . . . ) having various characteristics (gain, impedance, directionality, radiation efficiency and the like) can be utilized in combination with the RSSI based range adjustment discussed above to provide optimal coverage in a given scenario.

VIII—Exclusion Zone Operation—Sex Offender Context

Figure 5:
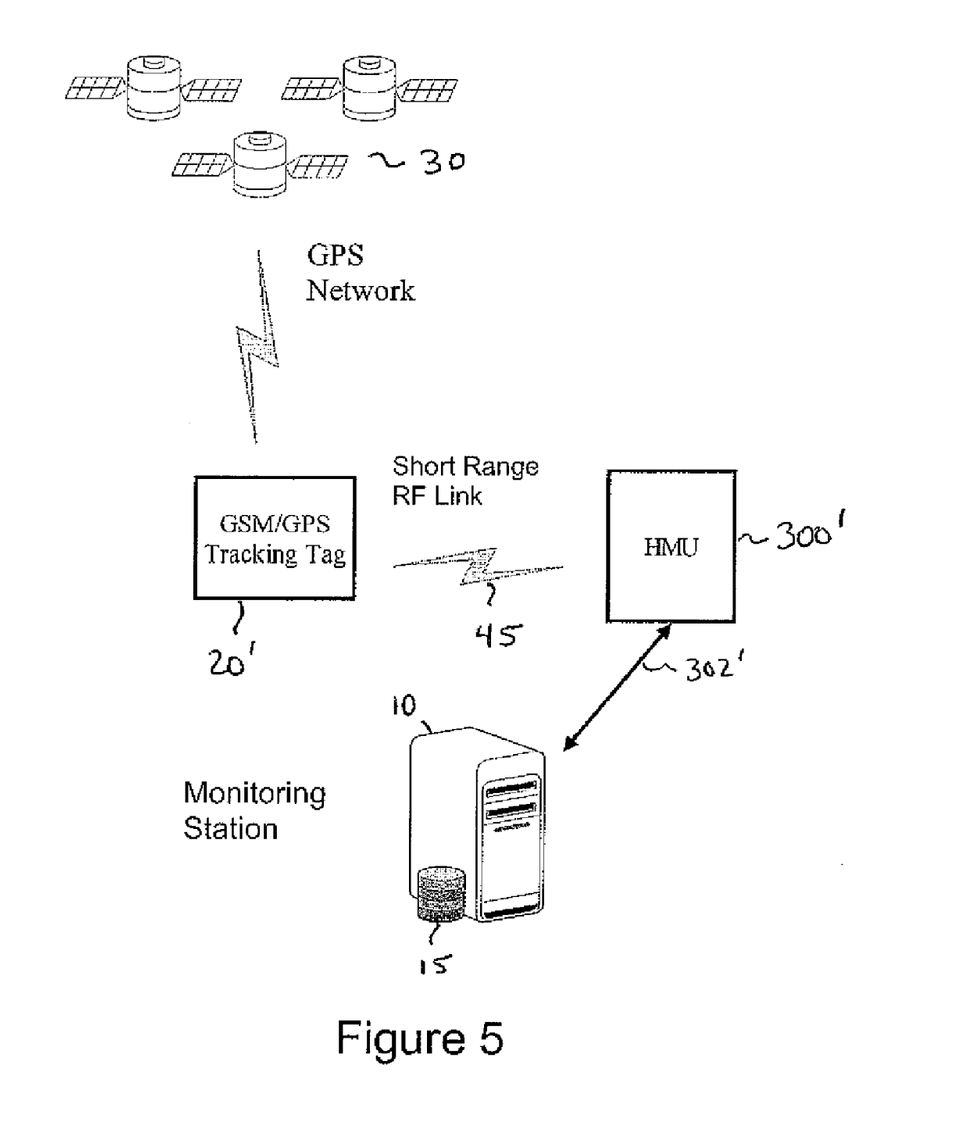
FIG. 5 shows a block diagram of an embodiment of the invention relating to the use of an HMU.

As discussed above in section IV, the auxiliary device can be utilized to establish an exclusion zone. This particular mode can be utilized to provide protection from monitored individuals. In the context of sex offender monitoring, the invention is particularly useful. Referring to FIG. 1, the offender is fitted with a tag 20. The tag carries out reporting functions with the CMS 10 as outlined above e.g., via the wireless network 25 or HMU 300 (see FIG. 5). Each individual desiring enhanced protection is provided with an auxiliary device (e.g., shown graphically as 40, 40', 40" . . . ). As discussed above, the auxiliary device can be integrated into an article of clothing such as shoes, socks, pants, shirts, or jackets. Integration of the auxiliary device into an article of clothing can help minimize the risk that the auxiliary device is misplaced or lost. In the alternative, the auxiliary device can be integrated into or attached to a backpack, purse, wallet or other convenient portable accessory. It is understood that tamper detection mechanism 214, buzzer 218 and/or accelerometer 215 can be omitted from auxiliary devices used in this context. This can further reduce the size and cost of such auxiliary devices. In this mode of operation, the location of the auxiliary devices 40, 40', 40" . . . need not be known to the CMS 10.

Operation of the system in this context would proceed as follows: the tag 20 detects an auxiliary device (i.e., the auxiliary device responds to the ping). The tag establishes communications with the auxiliary device, and reports some or all of the following information to the CMS 10: auxiliary device ID, tag ID, status of the tag (low battery and charging), status of the auxiliary device (motion or power). During this mode the tag 20 will continue with its normal operations and logging but with the additional details of the auxiliary device ID received and its status. This logging can occur relatively frequently (e.g., every one minute). During this mode the tag 20 will notify the central monitoring system of every auxiliary device heard; the tag 20 does not need to be configured with the auxiliary device details. Once the tag 20 reports the presence of an auxiliary device in an excluded area, the CMS 10 can determine whether there is unauthorized or undesirable proximity between a tag (e.g., associated with a sex offender) and an auxiliary device (associated with a child). It is understood that auxiliary device ID can have a format that is generally associated with a certain class of individual (e.g., child) and/or the auxiliary device ID can include specific information (e.g., a serial number) that is specifically associated with a single individual (e.g., a specific child).

IX—Predictive Crime Scene Correlation for'Sex Offenders

When operating in the mode discussed above, the system can also provide predictive correlation for potential offenders such as sex offenders. The CMS 10 contains sufficient information in the database 15 to identify the individual wearing tag 20 as well as the individuals or class of individuals carrying auxiliary devices 40, 40', 40" . . . . Once the programming in the CMS determines that there is unauthorized or undesirable proximity between a tag and an auxiliary device, the system can take one or more actions. For example, the CMS can i) notify local authorities, ii) notify the appropriate agent or parole office, and/or iii) notify other individuals that can take appropriate action. The CMS 10 software can also track trends over time. These trends can be tracked and analyzed to enhance the accuracy of any notification actions. For example, the CMS can utilize a threshold in connection with or prior to issuing a notification. Exemplary trends can include i) detection of auxiliary device ID associated with a child multiple times in the same general lat/long location as a sex offender, and/or ii) detection of auxiliary device ID associated with a child for more than a specified timer period in the same general lat/long location as a sex offender. The system can also provide notification of these trends to an agent for further investigation. This can alert the agent to trends that may not otherwise be apparent (e.g., the offender may be hanging around a school, bus stop, shopping mall, park or the like).

X—Suggested Uses of Each Mode

1) Inclusion Zone Operation (GPS Power Down)

To confirm the known location of an individual to the vicinity of an auxiliary device or auxiliary device when GPS is unavailable i.e. at home or in a establishment i.e., hostel.

To extend the operational life of the tag battery by allowing the tag to use the auxiliary device in a known location.

2) Report Only Mode—Exclusion Zone Operation
To allow the auxiliary device to be positioned in areas of importance and to notify the central monitoring system when a tag is within range i.e. schools or victims properties.

The auxiliary device with an extended battery back-up can be used in this mode by domestic violence victims or other persons who may require the device to operate as a mobile device. i.e. taking a trip to the mall or visiting the doctor. The generation of alarms (including audible and/ or visual alarms) may be added as desired. This mode can also provide protection for children in cases where there is unauthorized or undesirable proximity between the child and a sex offender.

3) HMU Range Expansion
To allow the auxiliary device to be positioned in such a way that with the operation of the HMU, a property can be effectively covered with the placement of auxiliary device to extend the HMU range.

The auxiliary device can be used in a number of modes depending on parameter settings on the tag and if a Home Monitoring unit (HMU is present).

While the foregoing description and drawings represent the preferred embodiments of the present invention, it will be understood that various changes and modifications may be made without departing from the scope of the present invention.

The invention claimed is:

1. A location tracking device, comprising:
location circuitry configured to receive data from which the location of the tracking device can be determined;
first wireless circuitry configured to transmit position data representative of the location of the tracking device to a remote location
second wireless circuitry configured to communicate locally within an auxiliary device; and
wherein the tracking device has a first operational mode in response to the absence of communication with the auxiliary device, wherein the tracking device is maintained in a normal operational mode;
wherein the tracking device is configured to enter a second operational mode in response to communication being established between the tracking device and the auxiliary device, wherein in the second operational mode at least portions of the tracking device is placed in a reduced operational mode.

2. The locating tracking device of claim 1, wherein the reduced operational mode of the tracking device includes at least one of:
increasing a period between when the location circuitry receives the data;
disabling the location circuitry entirely; and
increasing the period between which the first wireless circuitry transmits position data.

3. The location tracking device of claim 1, wherein the tracking device will transition from the second operational mode to the first operational mode in response to an alarm condition.

4. The location tracking device of claim 1, wherein the tracking device will transition from the second operational mode to the first operational mode in response to receiving a signal representing a low power condition at the auxiliary device.

5. The location tracking device of claim 1, wherein the tracking device will transition from the second operational mode to the first operational mode in response to receiving a signal representing movement of the auxiliary device.

6. The location tracking device of claim 1, wherein the tracking device will transition from the second operational mode to the first operational mode in response to receiving a signal representing tampering at the auxiliary device.

7. The location tracking device of claim 1, wherein the tracking device will transition from the second operational mode to the first operational mode in response to loss of communication with the auxiliary device.

8. The location tracking device of claim 1, wherein the tracking device is configured to attempt to contact the auxiliary device more often when in the second operational mode than when in the first operational mode.

9. The location tracking device of claim 1, further comprising at least two of the location tracking devices, each of the two being configured to communicate with the second wireless circuitry using different frequencies or transmitting on different schedules to avoid collision between signals.

10. The location tracking device of claim 1, wherein the tracking device consumes less power over time in the second operational mode compared to the first operational mode.

11. A location tracking device, comprising:
location circuitry configured to receive data from which the location of the tracking device can be determined;
first long range wireless circuitry configured to transmit position data representative of the location of the tracking device to a remote location,
second short range wireless circuitry configured to communicate locally with an auxiliary device, and
wherein the tracking device has a first operational mode in response to the absence of communication with the auxiliary device, wherein the tracking device is maintained in a normal operational mode;
wherein the tracking device is configured to enter a second operational mode in response to communication being established between the tracking device and the auxiliary device, wherein in the second operational mode the tracking device additional receives information from the auxiliary device and transmits the information to the remote location.

12. A location tracking system comprising:
an auxiliary device having short range wireless circuitry;
a locating tracking device, comprising:
location circuitry configured to receive data from which the location of the tracking device can be determined;
first wireless circuitry configured to transmit position data representative of the location of the tracking device to a remote location,
second wireless circuitry configured to communicate locally with the short range wireless circuitry of the auxiliary device, and
wherein the tracking device has a first operational mode in response to the absence of communication with the auxiliary device, wherein the tracking device is maintained in a normal operational mode;
wherein the tracking device is configured to enter a second operational mode in response to communication being established between the tracking device and the auxiliary device, wherein in the second operational mode at least portions of the tracking device is placed in a reduced operational mode.

13. The tracking system of claim 12, wherein the distance between the auxiliary device and the tracking device for which communication can be established is adjustable.

14. The tracking system of claim 12, wherein the auxiliary device has an adjustable threshold setting, wherein changes in the threshold setting contributes to the range between the auxiliary device and the tracking device for which communication can be established.

15. The tracking system of claim 14, wherein the threshold setting is received signal strength of the second wireless circuitry, wherein an increase in the threshold setting reduces the range between the auxiliary device and the tracking device for which communication can be established.

16. A location tracking method comprising:
providing location circuitry configured to receive data from which the location of a tracking device can be determined;
providing first wireless circuitry configured to transmit position data representative of the location of the tracking device to a remote location;
providing second wireless circuitry configured to communicate locally within an auxiliary device; and
wherein the tracking device has a first operational mode in response to the absence of communication with the auxiliary device, wherein the tracking device is maintained in a normal operational mode;
wherein the tracking device is configured to enter a second operational mode in response to communication being established between the tracking device and the auxiliary device, wherein in the second operational mode at least portions of the tracking device is placed in a reduced operational mode.

17. The locating tracking method of claim 16, wherein the reduced operational mode of the tracking device includes at least one of:
increasing a period between when the location circuitry receives the data;
disabling the location circuitry entirely; and
increasing the period between which the first wireless circuitry transmits position data.

18. The locating tracking method of claim 16, wherein the tracking device will transition from the second operational mode to the first operational mode in response to an alarm condition.

19. The location tracking method of claim 16, wherein the tracking device will transition from the second operational mode to the first operational mode in response to receiving a signal representing a low power condition at the auxiliary device.

20. The location tracking method of claim 16, wherein the tracking device will transition from the second operational mode to the first operational mode in response to receiving a signal representing movement of the auxiliary device.

21. The location tracking method of claim 16, wherein the tracking device will transition from the second operational mode to the first operational mode in response to receiving a signal representing tampering at the auxiliary device.

22. The location tracking method of claim 16, wherein the tracking device will transition from the second operational mode to the first operational mode in response to loss of communication with the auxiliary device.

23. The location tracking method of claim 16, wherein the tracking device is configured to attempt to contact the auxiliary device more often when in the second operational mode than when in the first operational mode.

24. The location tracking method of claim 16, further comprising at least two of the location tracking devices, each of the two communicating with the auxiliary device using the second wireless circuitry using different frequencies or transmitting on different schedules to avoid collision between signals.

25. A tracking system, comprising:
an auxiliary device including second short range wireless communications circuitry;
a monitoring device, comprising:
location circuitry that determines the location of the monitoring device;
cellular communication circuitry that transmits location data from the location circuitry;
first short range wireless communications circuitry having a shorter range than the cellular communication circuitry;
the monitoring device having first and second operating modes, wherein:
the first operating mode is during times when the monitoring device is not in communication with the auxiliary device, in which the monitoring device repeatedly determines its location and transmits the determined location to a remote location via the cellular communication circuitry; and
the monitoring device transitions from the first operating mode to the second operating mode in response to the monitoring device entering into communication with the auxiliary device through the first and second wireless communication circuitry;
wherein when in the second operating mode, the monitoring device initially determines its location, becomes wirelessly tethered to the auxiliary mode, and subsequently reduces the operations of the location circuitry;
wherein the combination of the initially determined location and the tethered status of the monitoring device to the auxiliary device replaces location determinations for at least portions of the second operating mode.

26. The tracking system of claim 25, further comprising the auxiliary device being configured to support a plurality of the monitoring devices, such that auxiliary device becomes a common hub that the plurality of the monitoring devices can simultaneously be wirelessly tethered to.

27. The tracking system of claim 12, further comprising the auxiliary device being configured to support a plurality of the tracking devices, such that auxiliary device becomes a common hub that the plurality of the tracking devices can simultaneously be wirelessly tethered to.

28. The tracking system of claim 12, wherein the tracking device consumes less power over time when in the second operational mode compared to when in the first operational mode.

* * * * *